United States Patent
Brundege

[15] 3,668,256
[45] June 6, 1972

[54] PURIFICATION OF ACETONE

[72] Inventor: Jasper A. Brundege, Dover, N.J.

[73] Assignee: Allied Chemical Corporation, New York, N.Y.

[22] Filed: Aug. 13, 1969

[21] Appl. No.: 849,851

[52] U.S. Cl. ......................................260/593 P, 260/593 A
[51] Int. Cl. ..............................................................C07c 49/08
[58] Field of Search ..................................260/593 P, 593 A

[56] References Cited

FOREIGN PATENTS OR APPLICATIONS 566,933  9/1957  Italy....................................260/593 P Primary Examiner—Daniel D. Horwitz
Attorney—Michael S. Jarosz

[57] ABSTRACT

Acetone free of aldehydic impurities is obtained by fractionally distilling crude acetone in a single, multiple-plate column and continuously introducing, at a point above the acetone feed, a counterflowing dilute alkaline solution, such as sodium hydroxide, the amount and concentration being sufficient to polymerize aldehydic impurities contained therein without forming a second liquid phase when the alkali mixes with the liquid in the column; and removing pure acetone from the top of the column and water and nonvolatiles as bottom products.

6 Claims, 2 Drawing Figures

PHASE DIAGRAM
ACETONE-WATER-SODIUM HYDROXIDE SYSTEM

INVENTOR.
JASPER A. BRUNDEGE
BY
*Earl R. Ross*
ATTORNEY

PURIFICATION OF ACETONE

BACKGROUND OF THE INVENTION

Crude acetone, such as obtained as a by-product with phenols from the catalytic decomposition of cumene hydroperoxide, most generally contains varying quantities of impurities. These impurities are especially difficult to remove from the acetone and yet, if present even in very small amounts, make the acetone unsuitable for numerous uses. For example, the National Formulary has established tests which acetone must pass in order to be labeled Acetone, NF. One such test is the well-known potassium permangate test. It is further known that impurities in crude acetone, which are responsible for its failure to pass the permangate test, include principally aldehydic substances such as propionaldehyde, and acetaldehyde. The prior art has heretofore described many methods for effecting separation of these aldehydic impurities, most of which depend upon differences in volatilities. In addition to effecting separation of impurities by distillation in one form or another, caustic has been used to facilitate purification. For example, the prior art has suggested that acetone may be purified by first pre-treating the acetone with sodium hydroxide to polymerize the aldehydes to high boilers and then subjecting the mixture to distillation. According to other processes, acetone is fed into a distillation column and sodium hydroxide solution is simultaneously injected into the column either above or below or at the same point as the acetone feed. The sodium hydroxide thus catalyzes the polymerization of the aldehydes present, thereby forming nonvolatile components which may be withdrawn as bottoms from the column, while pure acetone is withdrawn overhead.

The main disadvantage encountered in the prior art methods is that the polymerization of aldehydes with caustic under conditions suggested results either in a reversible process, making removal quite inefficient, or, using more rigorous conditions, in the degradation of a substantial portion of the acetone.

In accordance with the present invention, I have found a process for separating impurities from acetone prepared by the decomposition of the cumene hydroperoxide, which obviates the features of the methods presently being used.

SUMMARY OF THE INVENTION

High quality acetone, essentially free of water and aldehydic impurities, is obtained by continuously distilling crude acetone in a single, multiple-plate distillation tower in which a dilute alkaline solution mixes with the downflowing liquid so that said liquid remains rich in acetone and no other liquid phase is formed.

DESCRIPTION OF THE PREFERRED EMBODIMENT

According to the present invention, it has been found that crude acetone containing aldehydic impurities can be purified to an extent wherein it will pass the standard potassium permangate test, by combination of chemical treatment and distillation, effected in a single, multiple-plate distillation tower. The method of purifying acetone, according to the present invention, comprises distilling crude acetone whereby a vaporous mixture comprising water, acetone and aldehydic components, such as acetaldehyde and propionaldehyde, is formed further treating this vapor mixture with a counterflowing dilute solution of an alkali, particularly an alkali metal hydroxide, and removing pure acetone from overhead.

Figure 1:
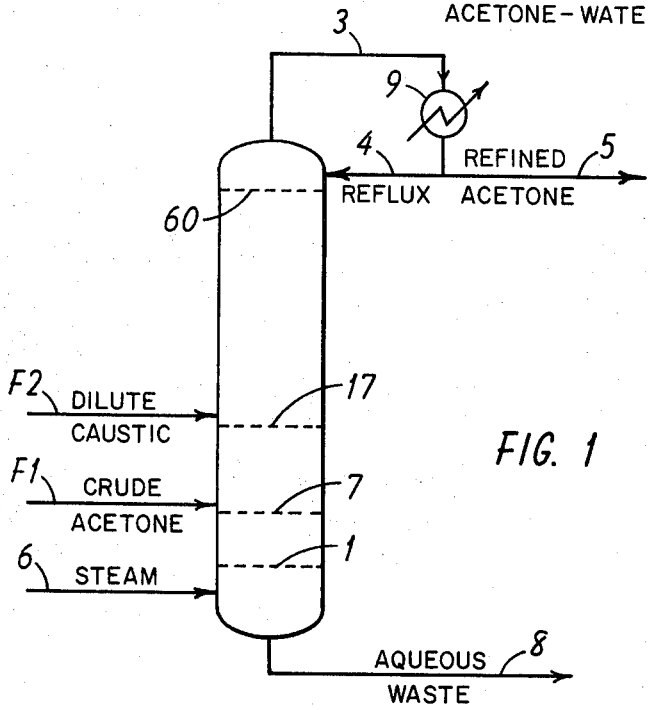

The invention may be better understood by referring to FIG. 1, which is a schematic flow diagram showing the arrangement of equipment adaptable for continuously performing the novel method on a commercial scale. The process utilizes a single tower containing multiple plates or trays, FIG. 1 illustrating a tower or column with 60 plates, and provided with conventional accessories such as heat source 6 for supplying heat, for example, in the form of steam to the bottom of the column, condenser 9, for condensing the vapors leaving the column, outlet 8, for withdrawing nonvolatile components from the bottom of the column, feed inlet F1, for feeding crude acetone to the column, feed inlet F2, for feeding dilute aqueous alkali through the column, pipe 3 for conveying overhead vapors to the condenser, pipe 4 for returning a portion of the condensed vapor to the column for reflux, and pipe 5 for withdrawing product. Plates 1, 7, 17, 57 and 60 represent a portion of the plates dispersed within the column; other plates are omitted for simplicity. The portion of the column between F1 and F2 is designated as the reaction zone.

Crude acetone is fed into the column through feed inlet F1 located in the lower section of the column about 7 to 10 plates above the steam source and below the alkali feed inlet F2, which is located about 15 or 20 plates above the bottom of the column. The alkali mixes with the downflowing liquid in the column forming a single, acetone-rich liquid phase which contacts the upflowing vapors of acetone and aldehydes, converting the aldehydes to nonvolatile polymers which tend to settle in the bottom of the column with water and the spent alkali, and which are removed through outlet 8. The rising vapors, now containing acetone and a small amount of water, are continuously rectified in the uppermost portion of the column, the vapor exiting the column above plate 60 through pipe 3 to condenser 9 and a portion of the condensate returned to the upper rectification zone through pipe 4. The other portion of the condensate, free of water, is withdrawn as refined product through pipe 5.

The term, "acetone essentially free of water," as used herein, means acetone containing less than 0.5 percent water.

Figure 2:
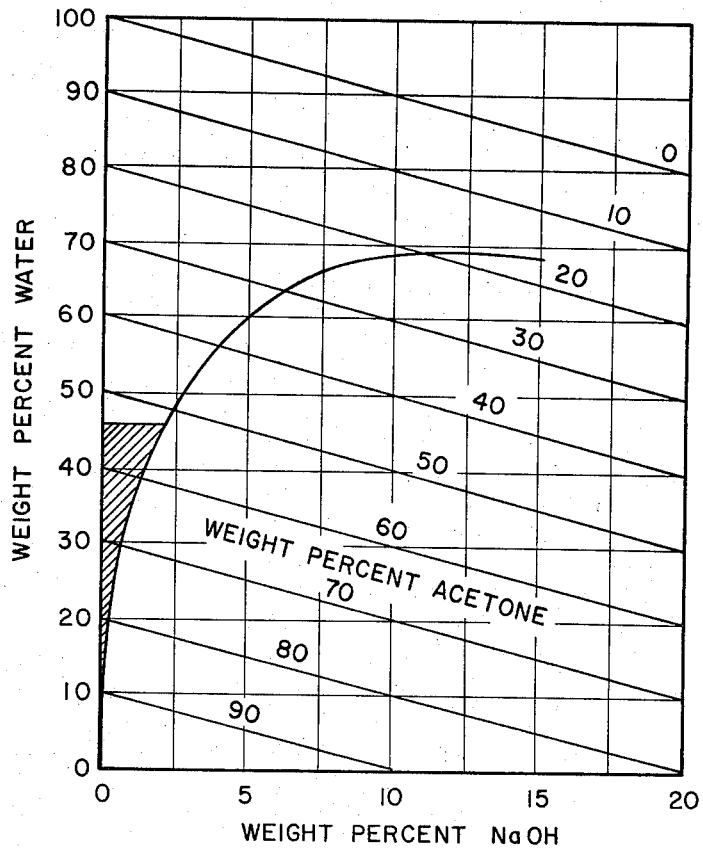

When sodium hydroxide, acetone and water are mixed together, depending on the relative proportions of each present, the resulting solution may contain two phases wherein the less dense liquid is known as the acetone-rich phase, and the more dense liquid is known as the alkali-rich phase; or the mixture may contain one phase comprising an acetone-rich phase. FIG. 2 illustrates this phase relationship; mixtures containing acetone, water and sodium hydroxide in the proportions represented by the region below the curve form two phases and within the shaded area, a single acetone rich phase.

We have found that aldehydic impurities can best be removed in a distillation column using an alkaline agent as a polymerization catalyst and under conditions wherein a single acetone-rich phase is formed in the reaction zone of the column.

The alkaline agent used in polymerizing the aldehydes may be any inorganic basic material as long as it is soluble in the acetone-rich liquid and will polymerize the aldehydes present. Suitable agents include: alkaline earth oxides, carbonates and hydroxides, and alkali metal oxides, carbonates and hydroxides, but preferably alkali metal hydroxides exemplified by sodium and potassium hydroxide.

The presence of a single acetone-rich liquid phase is important in that polymerization is dependent on the aldehydic impurities entering the liquid phase, and the latter is only possible if the liquid is rich in acetone, since the impurities are more soluble in acetone than water. The presence of a second liquid phase is to be avoided, since this would tend to reduce the column hold-up or residence time of the acetone-rich liquid phase. In addition, a second liquid phase, which is rich in caustic and poor in acetone, would tend to also polymerize and degrade acetone without effectively removing aldehydes present.

Thus, in effecting separation of the aldehydic impurities from the crude acetone according to the process described above, an alkali hydroxide, preferably sodium hydroxide or potassium hydroxide, is fed to the column at a rate and concentration sufficient to promote polymerization of aldehydes present without forming a second liquid phase in the reaction mixture. Accordingly, in order to efficiently effect polymerization without forming a second phase, it is necessary that the alkaline agent be introduced in a dilute (0.05–5.0 percent, preferably about 0.2–1.0 percent) solution and in amount in relationship to the acetone and water already present in the column so that solution is maintained.

The relative feed rate of acetone and alkali necessary in order to maintain a single acetone-rich liquid phase in the reaction zone will vary depending on the reflux rate and the concentration of alkali used. In the preferred embodiment of our invention, we find that purification may be suitably effected when the ratio of caustic feed rate to reflux rate is from 1:2 to 1:10, depending on the caustic concentration, and preferably 1:3.3 to 1:6.

As will be appreciated by those skilled in the art, the required reflux ratio is determined by the desired dryness of the refined acetone. For commercially dry acetone reflux ratios ranging from 2.1:1 to 3:1 are used.

Although the method described above illustrates the invention utilizing a column having 60 trays, modification of the column to contain more or less than 60 trays may be made in order to vary the efficiency of the system. Similarly, the plates placed within the column may be of conventional construction or design, such as the perforated or the overflow type, the limiting factor being the number and capacity being sufficient to afford proper contact between the rising vapor phase and the counter-flowing liquid phase in the reflux mixture.

EXAMPLE 1

Acetone was purified by continuously distilling in a three-section distillation column (25 mm in diameter) comprising a vacuum jacketed 15-plate Oldershaw central section and a packed upper section, representing 10 theoretical trays, and a packed lower section, representing 15 theoretical trays. Steam was passed into the bottom of the lower packed column, and crude acetone was fed at the bottom of the Oldershaw section at a rate of 2.4 grams/minute.

An aqueous 0.5 percent solution of sodium hydroxide was fed into the top of the Oldershaw section above the acetone feed at a rate of 2.4 grams/minute and the distillation carried out continuously at a reflux ratio of 2.3:1.

Bottom liquid was withdrawn at a rate of 4.71 grams/minute. This system was continuously operated for 35 hours, and samples of the acetone obtained from the overhead condensate were periodically tested for purity.

Table I, below, indicates the purity of acetone withdrawn from the top of the column.

TABLE I

| Sample | Hours of Operation | Acetaldehyde ppm | Propionaldehyde - ppm |
|---|---|---|---|
| Crude Acetone |  | 258 | 80 |
| 1 | 2 | 3 | trace |
| 2 | 10 | 3 | trace |
| 3 | 20 | 5 | 1 |
| 4 | 33 | 4 | 1 |

EXAMPLE 2

Crude acetone was continuously distilled at a reflux ratio of 3:1 in a 30-plate column (two 15-plate Oldershaw sections) equipped with a condensing unit at the top of the column and a bottom withdrawal and steam inlet at the bottom by introducing:

a. acetone containing 522 ppm of acetaldehyde and 228 ppm of propionaldehyde at a point approximating plate 15, and b. 0.1 percent sodium hydroxide at a point approximating plate 30 of the column, the feed ratio of acetone to sodium hydroxide being 1.4:1.

The vapors leaving the top of the column were condensed and a portion returned to the top of the column as reflux. The acetone condensate thus collected, when analyzed by gas chromatography, was found to contain 10 ppm of acetaldehyde and 5 ppm of propionaldehyde.

When the procedure was repeated using 1 percent sodium hydroxide and the acetone:sodium hydroxide feed ratio was 1:1, the acetone obtained from the overhead condensate had less than 0.3 ppm of acetaldehyde and propionaldehyde.

I claim:

1. In a process for purifying crude acetone containing aldehyde impurities, obtained by decomposition of cumene hydroperoxide, by fractionally distilling the acetone in a multiple plate distillation column while continuously adding to the column aqueous alkali metal hydroxide at a point above the acetone feed point, withdrawing pure acetone as overhead product from the top of the column and returning a portion of the overhead product to the column as reflux, the improvement which comprises, in combination:

a. adding the aqueous alkali metal hydroxide at concentration of from 0.05 to 5 percent by weight; and b. adding the aqueous alkali metal hydroxide in ratio of aqueous alkali metal hydroxide feed rate to reflux rate of from 1:2 to 1:10; the amount and concentration of alkali metal hydroxide being sufficient to polymerize aldehyde impurities contained therein without forming a second liquid phase.

2. The improvement of claim 1 wherein the aqueous alkali metal hydroxide has a concentration of from 0.2 to 1.0 percent by weight.

3. The improvement of claim 2 wherein the aqueous alkali metal hydroxide is added in ratio of aqueous alkali metal hydroxide feed rate to reflux rate of from 1:3.3 to 1:6.

4. The improvement of claim 3 wherein the acetone reflux ratio ranges from 2.1:1 to 3:1.

5. The improvement of claim 4 wherein the alkali metal hydroxide is sodium hydroxide.

6. The improvement of claim 5 wherein the alkali metal hydroxide is potassium hydroxide.

* * * * *